April 3, 1951        H. G. BUSIGNIES        2,546,970
DIRECTION FINDER SYSTEM

Filed Feb. 24, 1945                                          7 Sheets-Sheet 1

INVENTOR.
HENRI G. BUSIGNIES

BY

R P Morris
ATTORNEY

INVENTOR.
HENRI G. BUSIGNIES
BY
R P Morris
ATTORNEY

April 3, 1951   H. G. BUSIGNIES   2,546,970
DIRECTION FINDER SYSTEM
Filed Feb. 24, 1945   7 Sheets-Sheet 6

INVENTOR.
HENRI G. BUSIGNIES
BY
R. P. Morris
ATTORNEY

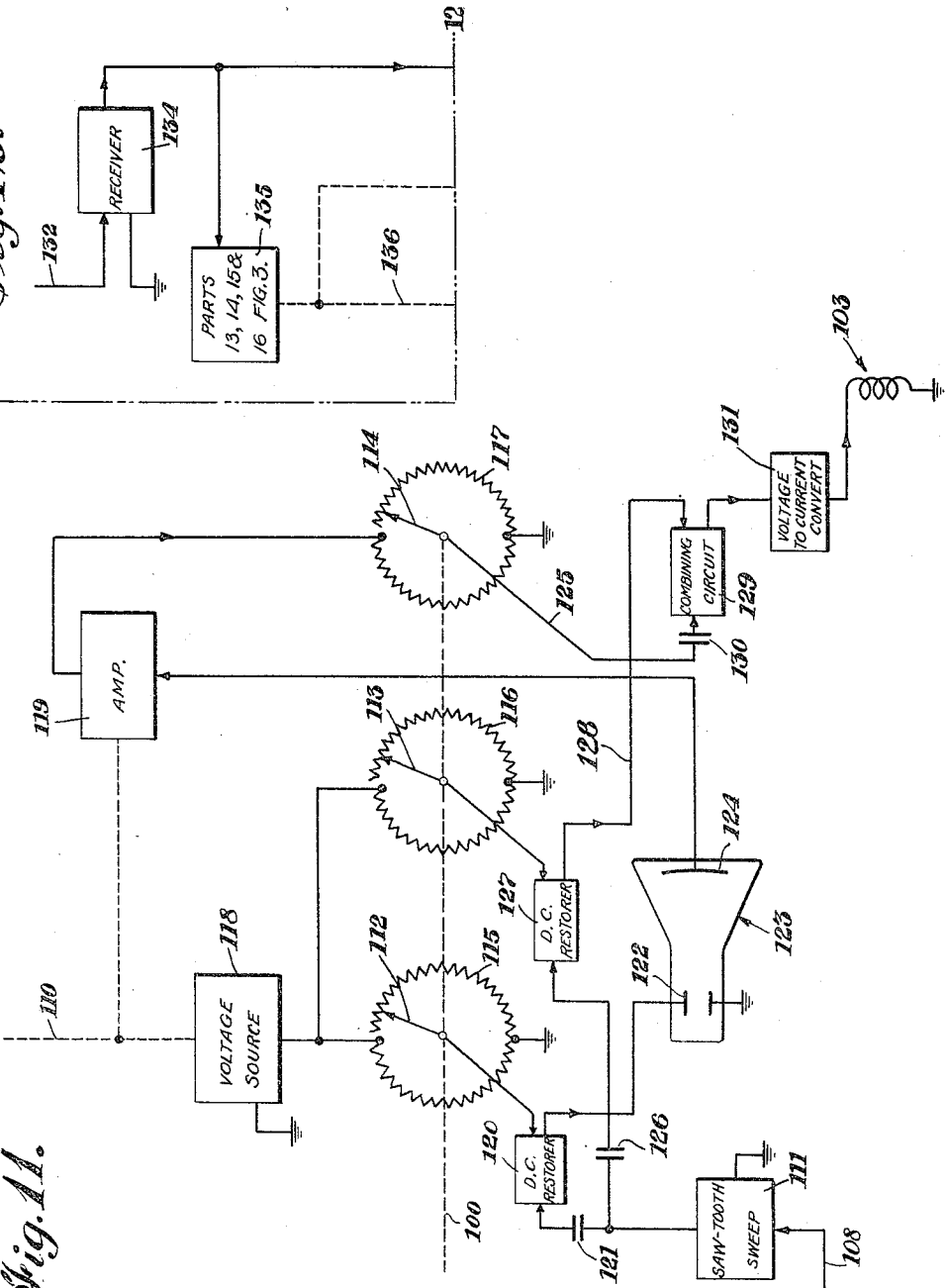

Patented Apr. 3, 1951

2,546,970

UNITED STATES PATENT OFFICE 2,546,970

DIRECTION FINDER SYSTEM

Henri G. Busignies, Forest Hills, N. Y., assignor to Federal Telephone and Radio Corporation, New York, N. Y., a corporation of Delaware Application February 24, 1945, Serial No. 579,568

30 Claims. (Cl. 343—112)

This invention relates to direction finding systems and more particularly to systems for providing position indication of objects in the field of a radio transmitter.

Numerous systems have been proposed for indicating the location of reflecting or reradiating objects in the field of a radio transmitter. In general, these systems comprise a transmitter and a receiver arrangement spaced relatively closely together. In this type of system the relative timing of energy transmitted from the transmitter and received at the same point after reradiation is used to provide a measure of the distance of the reradiating object and the angular position of the object with respect to the transmitter receiver is provided by suitable directional receivers.

One difficulty with this type of position indicating arrangement is that it requires a transmitter and a receiver equipment at the same location and therefore tends to complicate the equipment for position determining operation particularly if it must be carried on board a movable craft or other vehicle.

In my copending application, entitled "Position Finding Systems," Serial No. 579,567, filed of even date herewith, is described a system whereby the position parameters of one or more reflecting objects may be produced at a separate receiver, for example one carried on a craft without the necessity of a transmitter being present at the receiver location. In the system of this copending application, however, actual determination of position is dependent upon calculations made by the operator after the position parameters have been ascertained.

It is an object of my present invention to provide a position indicating system wherein the position of one or more reradiating objects may be indicated at a remote point by use of a transmitter and a spaced receiver apparatus.

It is also an object of my invention to provide a position finding system, involving the use of three relatively spaced locations of which two have direct or indirect radiation sources and the other only receiving and position indicating equipment.

It is a further object of my invention to provide a system wherein, by the use of radio transmitters or radio lighthouses at relatively fixed locations, the position of a craft with respect to the lighthouses and with respect to other reradiating objects may be indicated.

It is a still further object of my invention to provide a system and method wherein visual indications showing the relative location of a receiver, a transmitter and one or more reradiating objects may be produced at the receiver in response to received radiated energy.

It is a still further object of my invention to provide a receiver equipment in which is provided mechanism for calculating the position parameters of a location, as on a craft with respect to a transmitter and utilizing these position parameter calculations for providing a sweep circuit suitable for indicating the positions of one or more reradiating objects in the field of the transmitter.

According to a feature of my invention, one or more transmitters which may be termed radio lighthouses are provided. These transmitters are used to transmit energy over an area wherein is located the receiver equipment for this transmitted energy and one or more reradiating objects. These reradiating objects may be various craft in the vicinity as well as fixed objects or obstacles knowledge of whose location is desired as, e. g. for the purpose of avoiding them when the receiver is carried on a mobile craft which should be avoided by the craft carrying the receiver. The receiver equipment serves to ascertain the angles and the distance measurements necessary for calculating the position of the receiver with respect to the lighthouses. Equipment responsive to these measurements serves to provide a calculation of the relative position of the receiver and the lighthouse. Once this position is determined it may be utilized then to control the sweep circuit of an oscillograph indicator to provide in combination with a directive line swept at a predetermined rate from the transmitter position, the receiver position or both, a time basis on which distance indications of other reradiating objects may be made. Preferably also, the sweep circuit of the oscillograph indicator is caused to rotate at a speed determined by the direction finding rotation of the received reflected indications. The received reflected indications are then applied to the oscilloscope to produce indicating variations in the beam as it is swept over the face of the oscillograph indicator. Because of the combination distance and angular sweep of the indicator, the actual indicated location of the reradiating objects will be produced on the face of the cathode ray screen. These indications may be shown relative to the receiver apparatus location as the principal reference, or relative to the transmitter as the principal reference. The type of indication may be chosen by relating the sweep circuit to the angular determinations at the receiver, or to those at the transmitter.

While I have outlined above some of the objects and features of my invention, a better understanding of my invention and the objects and features thereof may be had by reference to the particular description of a few embodiments thereof made with reference to the accompanying drawings, in which:

Fig. 11 is a circuit diagram of a sweep generator for use with the receiver system of Fig. 10, and;

Fig. 12 shows a modified receiver part to replace the part of the circuit of Fig. 10 indicated by line 12—12.

In order to understand the principles of operation of my invention, it is convenient first to analyze the geometric relationships of the triangle formed by the transmitter, the mobile receiver unit with its synchronized direction finder and one arbitrarily selected reradiation point.

Figure 1:
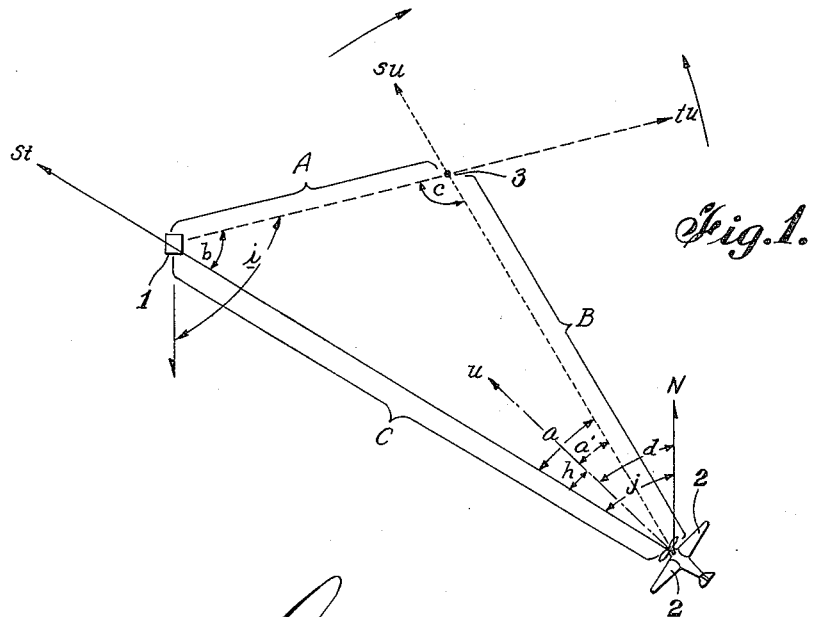
Fig. 1 is a diagrammatic plan layout of one form of radio lighthouse system together with the receiver system utilized to indicate triangles which must be calculated to produce the desired results.

Fig. 1 illustrates these relationships, the point I being assumed to represent the transmitter, preferably of a rotary type, which may be termed a radio lighthouse, the point 2 representing the synchronized direction finder on the airplane and the point 3 representing any reflecting or other reradiating object. The three angles of the triangle 1, 2, 3 are designated $a$, $b$ and $c$; the letters A, B and C designating the sides opposite such angles. The designations 2—1; 2—3; 1—3; represent respectively, the directions from point 2 through point 1, from point 2 through point 3, and from point 1 through point 3. The single letter $u$ is used to denote the direction in which the airplane is headed and the direction and N represents the magnetic north.

Referring to Fig. 1, it will be seen that the angle $a$ can readily be determined on board the mobile unit, shown as an airplane by means of two radio direction finders (or one twin direction finder) which determines the directions 2—1 and 2—3, respectively. Both these directions are most conveniently measured with respect to the direction $u$ representing the axis of the plane so that the angles directly given by the action of the direction finders are angles $h$ and $a'$. The angle $h$ varies comparatively slowly as a result of the plane changing its location or its heading and in the embodiments shown in Figs. 3 and 4 the direction finder which determines the angle $h$ is of the self-aligning type which maintains its antenna array constantly oriented in the direction 2—1. The angle $a'$, on the other hand, varies quite rapidly since the direction 2—3 represents the reception lobe of a sharply directive antenna which is assumed to rotate about twenty times per second. Nevertheless, at the instant when reradiated pulses are received from a given object 3, the value of the angle $a'$ is known since this corresponds to the angular position of the rapidly rotating receiving antenna. By combining the angles $h$ and $a'$, therefore, the angle $a$ which is one of the angles of the basic triangle shown in Fig. 1 is known on board the plane at the instant when the reflected pulses are being received from the object 3.

The angle of rotation of the beam transmitted from transmitter 1 is also determined at this same instant by reference to the cycle of rotation of transmitter 1. This angle $b$ can readily be determined by noting the time when the transmitter beam swings past the airplane and by starting a shaft rotating at such time. Assuming that the transmitter beam rotates at a known or a determinable and fairly constant speed, it is a simple matter to maintain the rotating shaft in substantial synchronism with this beam so as to know at any instant the value of the angle $b$.

Knowing the angles $a$ and $b$ (and consequently, the angle $c$), the shape of the triangle 2, 1, 3 is fully determined, but so far, no information with respect to the size of this triangle is available.

In order now to determine the size of the triangle, the synchronized direction finder on board the plane makes use of the delay time $\Delta$ between the arrival of the direct pulse traveling from 1 to 2, and the arrival of the corresponding indirect pulse traveling from 1 to 3 and thence to 2. As can be seen from Fig. 1, D, the difference in path for the direct and indirect pulses, is equal to A+B—C. Since the delay time $\Delta$ is proportional to the path difference D, we may regard D as known on board the plane.

Knowing the angles of the triangles and the value of D, it is clear that the lengths of all the sides of the triangle are determined. If it is desired to display at 2 an indication of the type which would be displayed on a reflection type position indicator at 2, the length of the side B must be automatically computed and must be used to determine the amount of radial deflection of the spot on an oscilloscope as will be described later, the direction of this deflection being controlled so as to be in the direction 2—3. If, on the other hand, a duplicate display type of indication is desired, that is, a display that would be produced by a position indicator at 1, the length of the side A must be automatically computed and used for determining the amount of radial deflection. In the case of a "self-orienting" duplicate display indication, the deflection should be in the direction 1—3, while in the case of a "fixed map" duplicate display indication, the deflection should again have a value proportionate to A, but the direction of the deflection should be at an angle $i$ with respect to the bottom of the oscilloscope (assuming that the bottom of the scope represents magnetic south). The angle $i$ is readily determined on the plane since $i$ equals $j+b$, and since angle $b$ is known and angle $j$ can be readily measured.

Figure 2:
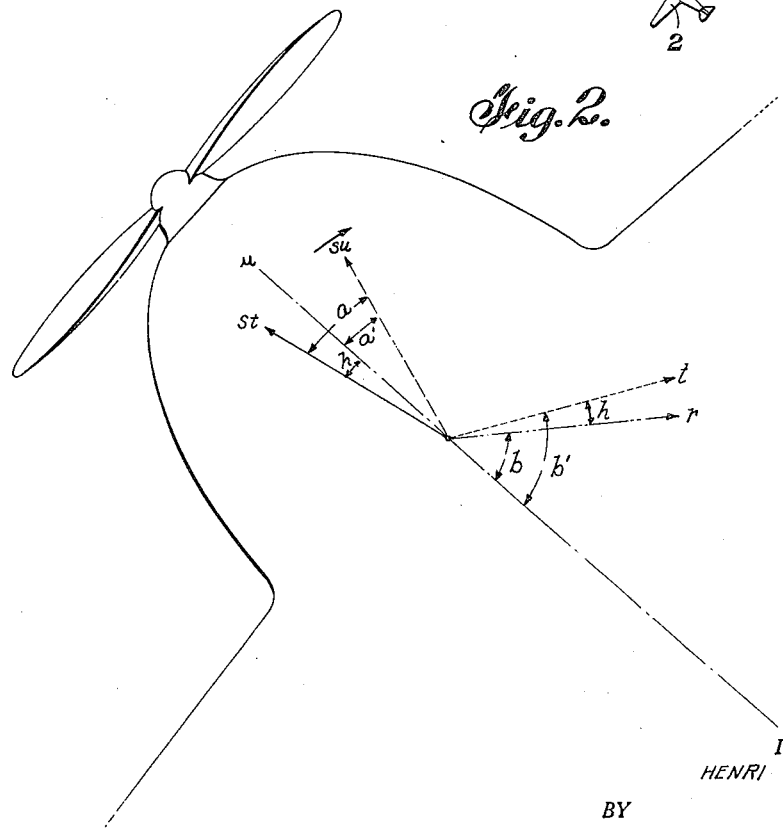
Fig. 2 is a diagrammatic showing of the angular relationship of the various parameters showing their relationship with respect to an aircraft carrying a receiver.
Figure 3:
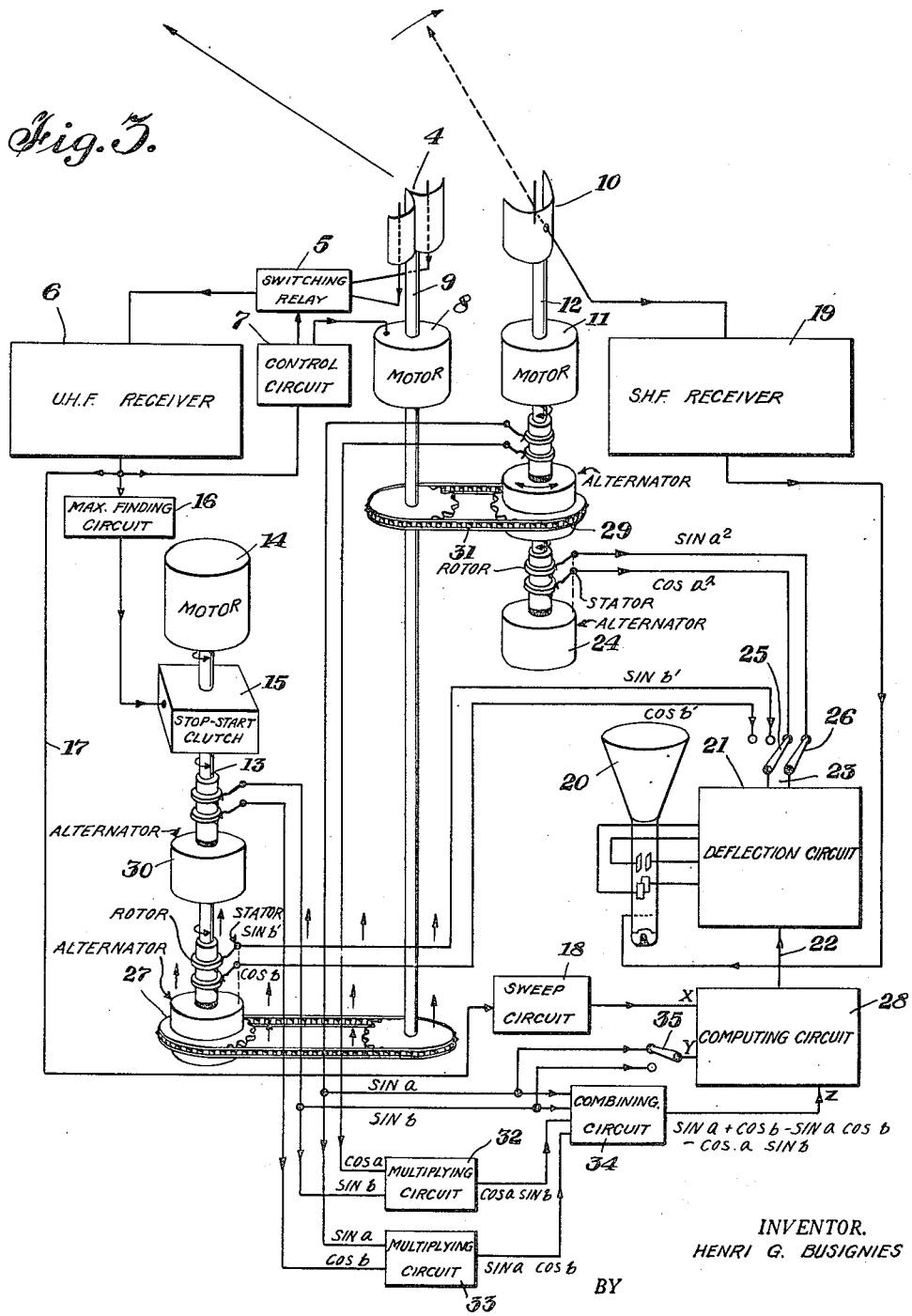
Fig. 3 is a schematic circuit and mechanical layout diagram illustrating a receiver equipment which may be used with the transmitter arrangement shown in Fig. 1.

Referring to Fig. 3 which illustrates a synchronized direction finder employing electronic computation, and to Fig. 2 which illustrates the relationships of the various directions and angles made use of by this apparatus, the manner in which the equipment operates to give the desired result will be traced in detail.

The array 4, together with the switching relay 5, receiver 6, alignment control circuit 7 and motor 8, acts in well known manner to keep the axis of this array constantly aimed at the transmitter 1. The array 4 is of the equi-signal type whose reception lobe is switched back and forth by relay 5. The output of receiver 6 is delivered to alignment control circuit 7 which energized the motor 8 as required to maintain the axis of the array constantly in the direction 2—1. In consequence, the shaft 9 which carries array 4 is always so oriented that its rotary position with respect to the axis of the airplane represents the angle $h$.

The directional receiving antenna 10 is continuously rotated at a comparatively high speed, e. g. 1200 R. P. M. by a motor 11. At the instant when this antenna is aligned with the given reflecting object 3, the rotary position of the corresponding shaft 12 with respect to the center line of the plane will represent the angle $a'$.

A third shaft 13 is provided which is driven by motor 14 through start-stop clutch 15. By means of the maximum finding circuit 16 which selects the maximum signal output from receiver 6, the start-stop clutch 15 is tripped each time that the beam from the rotary lighthouse sweeps past the airplane. Since the speed of rotation of the lighthouse beam is assumed to be a given speed such as 15 R. P. M., while the speed of motor 14 is slightly greater, for example 15 1/20 R. P. M., it will be clear that the shaft 13 will rotate practically in synchronism with the beam from the transmitter, being about 1/3 of 1% more rapid than the actual beam. At the end of each rotation, the shaft 13 will stop for a very brief instant and will then again start to rotate in synchronism with the beam upon reception of the succeeding control pulse.

It will thus be seen that the synchronized direction finder illustrated in Fig. 3 includes three shafts 9, 12 and 13, whose rotary positions with respect to the center line of the airplane represent respectively, the angles $h$, $a'$ and $b$. The positions of these three shafts determine all the angular directions required on board the airplane.

In addition to the determination of the angles $h$, $a'$ and $b$, the synchronized direction finder must also determine the delay time $\Delta$ between the arrival of the direct pulse from the transmitter 1 and the arrival of the indirect pulse reflected from object 3. For this purpose, the direct pulse from the lighthouse 1 is received by array 4 and after reception in receiver 6 is applied over line 17 to start the sweep circuit 18. Subsequently, the reflected pulse from obstacle 3 is picked up by antenna 10, received in receiver 19 and applied to the intensity control grid of the oscilloscope 20 to produce a bright spot.

The position in which this bright spot appears will depend upon the direction of the radial deflection and the magnitude of this radial deflection. Both the direction and magnitude of the deflection are controlled by deflection circuit 21 which is in turn controlled by an input voltage applied at 22 for determining the magnitude of the deflection and by a pair of control voltages applied at 23 for determining the angular direction of the deflection. This deflection circuit 21 may be of wholly electronic design, but is preferably an electromechanical coupling arrangement similar to an antenna goniometer and driven by a two-phase motor whose rotation is controlled by the voltages applied at 23.

The voltage applied at 22 to determine the radial magnitude of the deflection is derived by a computation procedure more fully considered below. The angle determining voltages applied at 23 are very simply produced by alternator 24 which is driven by shaft 12 so that its angular position always corresponds to the angle $a'$ as previously explained. Accordingly, a two-phase motor driving the rotor equipment in the deflection circuit 21 will rotate in corresponding manner so that at any instant its angular position also corresponds to the angles $a'$, thus assuring that the deflection of the oscilloscope beam will be in the direction 2—3.

With switch blades 25 and 26 in the position shown, the two-phase voltage applied at 23 has a given frequency, 20 cycles per second, for example, and a simple two-phase motor as above described will operate satisfactorily. If, however, these switch blades 25 and 26 are thrown to the left hand position (for the purpose of producing a duplicate type of indication as more fully described hereinafter) the frequency of the two-phase voltage from generator 27 applied at 20 will then be only 1/4 cycle per second, for the specific value given of one cycle per second. If it is desirable to avoid the difficulties of designing a two-phase synchronous motor for such a low frequency, a Selsyn type of motor may be substituted and alternators 24 and 27 may be replaced by Selsyn generators. In such case, the actual voltages applied at 23 would have a different frequency, of say 400 cycles, and the values sin $a'$ cos $a'$ (or sin $b'$ cos $b'$) will then represent not the actual values of the applied voltages, but rather the modulation envelope of the 400 cycle voltages.

Consideration will now be given to the manner in which the voltage applied at 22 is determined by the computing circuits so as to give a radial deflection proportionate to side B of triangle 2, 1, 3 (see Fig. 1). Referring to Fig. 1 and applying the well known law of sines to the triangle therein shown, it will be clear that $$\frac{B}{\sin b} = \frac{A}{\sin a} = \frac{C}{\sin c}$$

while from the definition of the path difference D, it will be clear that $D = A + B - C$. Solving these equations for B and A, we obtain the following:

$$B = D \frac{\sin b}{\sin a + \sin b - \sin c}$$

$$A = D \frac{\sin a}{\sin a + \sin b - \sin c}$$

These formulas may be rewritten in varying forms depending on the type of computation equipment to be employed. For the type of computation illustrated in Fig. 3, these formulas may be rewritten as follows:

$$B = D \frac{\sin b}{\sin a + \sin b - \sin a \cos b - \cos a \sin b}$$

$$A = D \frac{\sin a}{\sin a + \sin b - \sin a \cos b - \cos a \sin b}$$

Since the time delay Δ between the direct and reflected pulses is proportioned to D, and since the output voltage of sweep circuit 18 at the instant of arrival of the reflected pulse from any given obstacle 3 is proportionate to the corresponding delay time Δ, the circuit constants may be chosen so that the output voltage of circuit 18 at the instant of reception of the reflected pulse represents the distance D with a desired constant of proportionality. This voltage D is applied at input X of computing circuit 28.

A set of four voltages, having values sin $a$, cos $a$, sin $b$ and cos $b$ are derived from alternators 29 and 30. The alternator 30 has its stator fixed and its rotor turned by shaft 13, so that its voltages represent the sine and cosine functions of angle $b$. The alternator 29 has its rotor turned by shaft 12, while its stator is turned by a chain drive 31 from shaft 9, so that the relative position of the rotor with respect to the stator represents the angle $a$. Thus, the output voltags of this alternator 29 represent the sine and cosine functions of the angle $a$. By use of multiplying circuits 32 and 33, voltages proportionate to the products (cos $a$) (sin $b$) and (sin $a$) (cos $b$) are produced. These two products, together with the functions sin $a$ and sin $b$ are applied to combining circuit 34, which yields an output voltage corresponding to the algebraic sum sin $a$+sin $b$− sin $a$ cos $b$−cos $a$ sin $b$), and this voltage is applied to input Z. With switch blade 35 in the position shown, a voltage representing sin $a$ is also applied to input Y of computing circuit 28. This computing circuit 28 is designed to give an output equal to $X \cdot Y \div Z$ so that the output voltage from this computing circuit is equal to $$D \frac{\sin b}{\sin a - \sin b - \sin a \cos b - \cos a \sin b}$$

Accordingly, the voltage applied at input 22 of deflection circuit 21 is proportionate to sine B of the triangle 2, 1, 3, (see Fig. 1).

The indication given by the oscilloscope under these conditions is, therefore, of the type in which the indications correspond to a transmitter and reflector for position determination on the craft since every reflected or reradiated pulse received from any obstacle such as 3 will give rise to a spot whose angular direction of deflection will correspond to direction 2—3 and whose magnitude of radial deflection will be proportionate to the side B of the triangle shown in Fig. 1.

If switch blades 25, 26 and 35 are shifted to the opposite position, a type of indication corresponding to that of a receiver indicator at position 1 will be given. It is clear that the voltage applied at input 23 of deflection circuit 21 for determining the angle of deflection of the beam at any instant will be controlled by alternator 27 instead of by alternator 24. This alternator 27 has its rotor driven by shaft 13 corresponding to angle $b$, and has its stator driven by shaft 9 corresponding to angle $h$ so that the voltages generated by this alternator represent the sine and cosine functions of angle $b'$, where $b' = b + h$ (see Fig. 2). Accordingly, the direction of deflection of the beam at any instant will correspond to the direction 1—3 (see Figs. 1 and 2).

The magnitude of the radial deflection must also be made proportionate to the side A of triangle 2, 1, 3 for this duplicate type of indication. This is effected by the shift of switch blade 35 which now applies to input Y, the voltage representing sin $b$. Thus, the voltage delivered by computing circuit 28 to input 22 of deflection circuit 21 will now be proportionate to $$D \frac{\sin a}{\sin a - \sin b - \sin a \cos b - \cos a \sin b}$$

Figure 4:
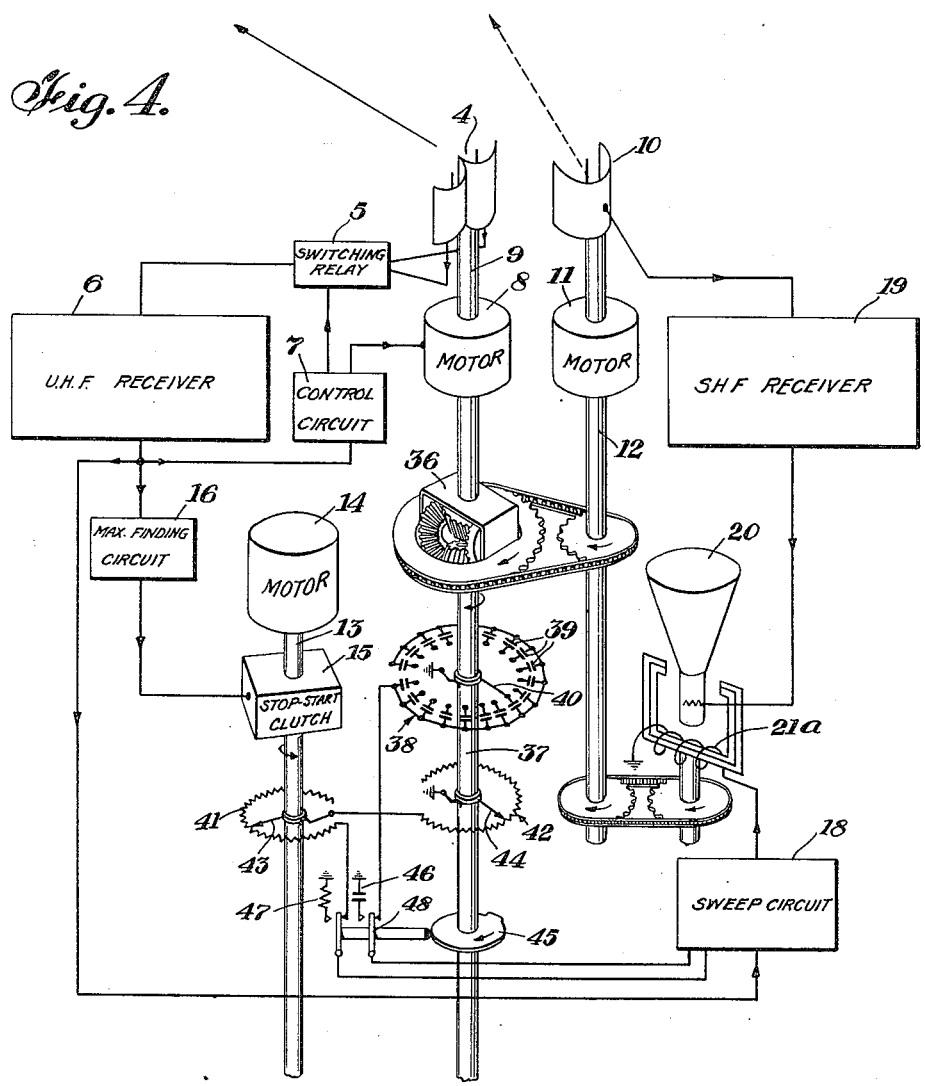
Fig. 4 is a schematic circuit and mechanical diagram showing another form of receiver for use with the system shown in Fig. 1.

In Fig. 4, another form of synchronized direction finder is illustrated which performs essentially the same functions as the form shown in Fig. 3, but which makes use of rotary switches rather than electronic circuits for performing the computations. For simplicity of illustration, this circuit is shown only for giving an indication similar to that of Fig. 3 in the switching position shown. It is clear, however, that the dual indication feature may be very simply provided in the case of Fig. 4, if desired, from the teachings previously given.

The shafts 9, 12 and 13 of Fig. 4 correspond exactly to the similarly designated shafts in Fig. 3, and the action of array 4, antenna 10, switching relay 5, receiver 6, alignment control circuit 7, motors 8 and 11, receiver 19, maximum finding circuit 16, motor 14 and start-stop clutch 15, is exactly as previously described. Since no alternators are employed in the arrangement of Fig. 4, so that the device of rotating the stator from one shaft, and the rotor from another shaft cannot be made use of, it is necessary to provide other means for combining the angles $h$ and $a'$ to give the angle $a$. This is done by means of a differential gear train 36, which rotates a fourth shaft 37 so that the angular position of this shaft 37 always corresponds to angle $a$. The deflection circuit 21A is shown as a rotary magnetic type instead of the deflector plate type shown in Fig. 3. It is clear that these deflection circuits may be used interchangeably in the circuits of Figs. 3 and 4 as desired.

The sweep circuit 18 is essentially similar to that described in Fig. 3, excepting that the speed of the sweep is determined by the time constants of external resistor and capacitor equipment. The value of the capacitance is determined by a capacitor switch 38 constructed somewhat like a motor commutator with a plurality of segments, for example 400 or more, and having capacitors 39 of varying value connected to the separate segments so that the effective value of the capacitance connected in the circuit varies with the angle $a$. When the wiper 40 is in use, the capacitance presented by capacity switch 38 is equal to the absolute value of sin $a$.

The resistance which cooperates with this capacitance to determine the speed of the sweep circuit 18 is provided by two rheostats 41 and 42 connected in series with each other and provided with wipers 43 and 44. Preferably, these rheostats are constructed similarly to capacitance switch 38 but with a number of resistors substituted for the capacitors. The values of these resistors are so chosen that the resistance presented by rheostat 41 is equal to the absolute value of tan ½ $b$, while the resistance presented by the rheostat 42 is equal to the absolute value of tan ½ a.

The computation performed in the apparatus of Fig. 4 is based upon a slightly different form of the equations previously set forth. The equations employed in the apparatus of Fig. 4 are transposed into the form $$B = D \frac{1}{\sin a (\tan \tfrac{1}{2} a + \tan \tfrac{1}{2} b)}$$

and $$A = D \frac{1}{\sin b (\tan \tfrac{1}{2} a + \tan \tfrac{1}{2} b)}$$

Since the rate of rise of voltage of a linear sweep circuit controlled by capacitance and resistance is inherently inversely proportional to the product of the capacitance and the resistance, the voltage produced by such sweep circuit will inherently be directly proportional to the time interval from the start of the sweep to the instant under consideration and inversely proportional to the product of capacitance and resistance. As previously described, the capacitance is proportional to sin $a$, while the resistance is the sum of two resistances proportional to tan ½ $a$ and tan ½ $b$, respectively. Thus, it will be clear that the voltage delivered at the output of sweep circuit 18 will be proportional to $$\Delta \frac{1}{\sin a (\tan \tfrac{1}{2} a + \tan \tfrac{1}{2} b)}$$

Since $\Delta$ is proportional to D, it is clear that the output voltage is proportional to B, which is the desired condition.

It will be apparent that the formula used must break down when either $a$ or $b$ is close to 180 degrees, since the resistance values of rheostats 41 and 42 cannot practically be made to represent tan ½ $a$ and tan ½ $b$ for those values of $a$ and $b$ at which the tangent of ½ the angle goes to infinity. Referring to Fig. 1, it will be seen that the 180 degree values of $a$ and $b$, respectively, represent the conditions where the obstacle 3 is very nearly in line with 2 and 1, but outside of the region between 2 and 1.

In the case of an object between 2 and 1 and very nearly in line therewith, the definition given by the formula will also be poor since the denominator sin $b$ (tan ½ $a$ — tan ½ $b$) becomes small and D also becomes small, so that the formula for B tends to approach the indeterminate form, $$B = 0 \frac{1}{0}$$

When the duplicate display type of indication is to be given, that is an indication as at position 1 made on the craft 2, the outside region beyond the airplane is the one which is inherently difficult to eliminate. In the case of phantom type of indication, that is an indication as seen by a position determining transmitter and receiver on the craft, the inherently troublesome outside region is the region beyond the lighthouse. It can readily be seen from a consideration of Fig. 1 that this region of poor definition is more or less inherent in the system as illustrated since the delay time $\Delta$ between the direct and reflected pulses for objects in this region gives no accurate indication of the distance between 1 and 2 or between 3 and 2, but only indicates the distance between 3 and 1.

With respect to obstacles in the other "outside" region discussed (i. e., approximately in line with 2 and 1, but lying on the far side of point 2), a clear indication of position may be given since the delay time $\Delta$ represents very nearly twice the distance between the point 2 and the object 3 under such conditions. As above pointed out, however, the normal type of computation shown in Fig. 4 is such as to give very poor accuracies for objects in this region since tan ½ $a$ approaches infinity. Accordingly, in the arrangement of Fig. 4, a cam 45 has been provided which disconnects the capacity switch 38 and the rheostats 41 and 42 and substitutes a fixed condenser 46 and resistor 47 in place of these devices 38, 41 and 42, when the angle $a$ is very close to 180 degrees. The fixed value of resistor 47 and capacitor 46 substituted is such that the radial deflection of the oscilloscope spot will correspond to ½ the delay time $\Delta$. Thus, the effect of cam 45 and switch 48 is to substitute the very simple formula $B = \tfrac{1}{2} D$ for the more complex general formula employed during most of the rotation.

It will be clear that if desired the apparatus of Fig. 4 may be arranged for giving a duplicate indication rather than a phantom type indication. For the purpose, the capacity switch 38 will be arranged to be driven by shaft 13 instead of by shaft 9 and the deflection coil 21A will be rotated by shaft 13 rather than by shaft 12. The shift to a simple formula would be arranged to give good definition for obstacles lying behind the transmitter 1 rather than for obstacles lying behind the synchronized direction finder 2.

Figure 5:
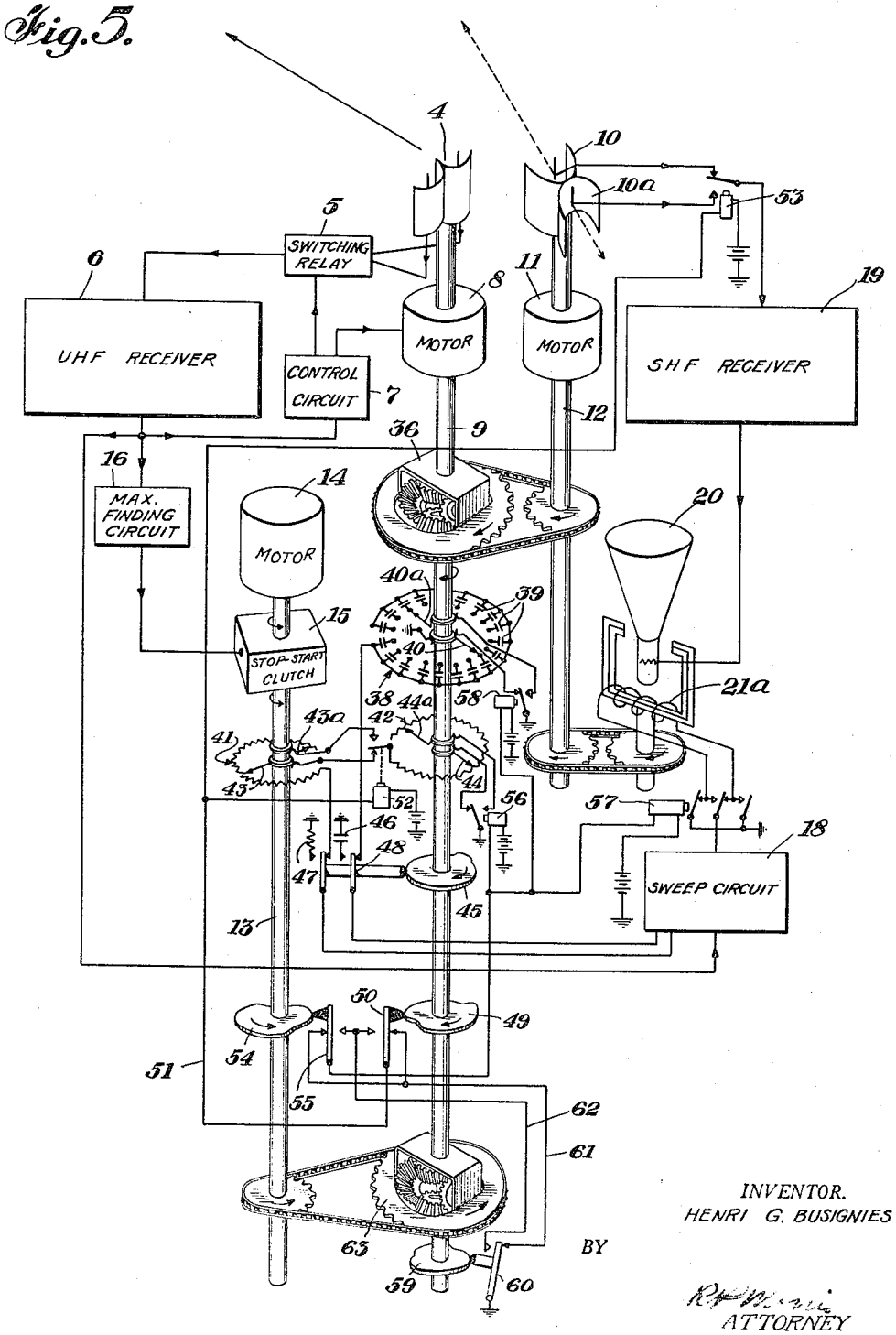
Fig. 5 is a still further circuit and mechanical schematic diagram showing a still further modification of my invention useable with the beacon system of Fig. 1.

In order to increase the brilliance and definition of the indication, either the synchronized direction finder 2 or the transmitter 1 or both may be arranged with multiple beams in place of the single beams described in connection with Fig. 1. The equipment shown in Fig. 5 represents schematically the modification required for operating with two beams radiated from the transmitter and two reception beams provided at the synchronized direction finder 2. With the equipment of Fig. 5, it is assumed that the transmitter radiates two beams 180 degrees apart. The antenna 10 of the synchronized direction finder shown in Fig. 5 is provided with a duplicate receiving antenna arrangement 10A exactly similar to 10, but aimed in the opposite direction. Additional wipers are provided at 40A, 43A and 44A on capacity switch 38 and rheostats 41 and 42.

In order to render the correct reception pattern active at the proper times as well as properly to select the normal or auxiliary wipers of the devices 38, 41 and 42 and the appropriate polarity for deflection coil 21A, two sets of relays are provided. The first set of relays may be considered as controlled principally by cam 49 and contacts 50. Line 51 then connects to relays 52 and 53 to select the brushes 43 and 43A in accordance with the position of cam 49 and its contact 50. Simultaneously relay 53 serves to reverse the connections so as to couple selectively antennas 10 or 10A to receiver 19. A second cam 54 together with its contact 55 serves selectively to control relays 56, 57 and 58. Relays 56 and 58 serve to switch between brushes 40 and 40A and 44 and 44A respectively, while relay 57 serves to reverse the connections of deflecting coil 21A. These reversing relays described above are shown in the normal position so that the antennas and the various wipers are arranged in the same manner as shown in Fig. 4. However, upon rotation of cams 49 and 54, the connections will be reversed so that antenna 10A is effective and the proper brushes for the calculating circuit are simultaneously made effective. Another cam arrangement 59 together with its contact 60 serves selectively to ground lines 61 and 62. This cam 59 is driven through the combined effect of differential gearing 63 so as to provide the ground circuits for contacts 50 and 55 at different times depending upon the raised brushes of cam 59. The times of energization of the various relays are controlled by cam 54 to transfer the switch 55 from its normal contact to its abnormal contact whenever the angle $b$ is between 180 and 360 degrees. Cam 49 similarly transfers its contact 50 from the normal contact to its opposite contact whenever the angle $a$ is between 180 and 360 degrees. Cam 59 is driven by the differential gear train 63 so that its rotary position always corresponds to the sum of angles $a$ and $b$ and is arranged to transfer its switch 60 from the normal contact to its other position whenever the sum of $a$ and $b$ is between 180 and 360 degrees or between 540 and 720 degrees.

Figure 6:
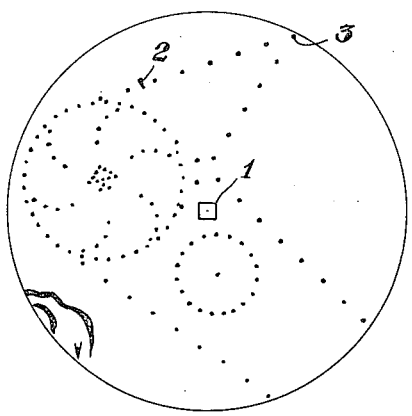
Fig. 6 is an illustration of the indications which will be produced on a cathode ray screen in the usual type of position indicator of the known prior art.
Figure 7:
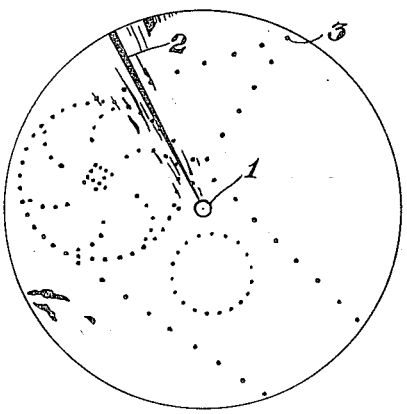
Figs. 7 and 8 illustrate indicator showings of the same area shown in Fig. 6 illustrating the type of indication which may be produced on the craft using a system of the type shown in Figs. 3 to 5, inclusive.

Fig. 6 illustrates the indications which would be obtained on a position indicating system located at 1 of Fig. 1 showing the relative position of the receiver 2, a reflecting and reradiating object 3 and a plurality of other reradiating objects which may be active or passive repeaters arranged to outline the air strips at a landing field and the approach paths to be used. Fig. 7 shows this same type of display indication that might be produced on a receiver of the type shown in Figs. 3, 4 and 5. It will be noted that the pattern shown on the screen is substantially the same as that shown in Fig. 6. However, in the area directly between transmitter 1 and receiver 2, the outline is not clear since objects located in this specific area will not be clearly set forth.

Figure 8:
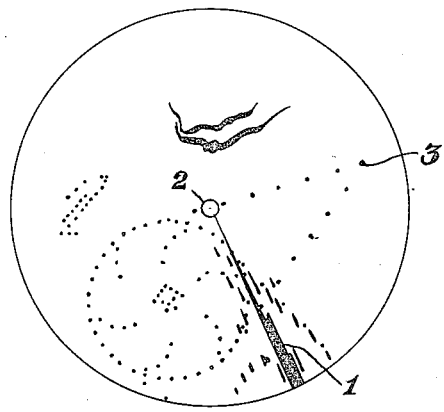

Fig. 8 illustrates the type of phantom indicator wherein the indications are substantially the same as would be produced were the transmitter located on the craft adjacent the receiver. Here again, it is seen that the entire pattern is quite clearly produced except for the region intermediate transmitter 1 and receiver 2.

Figure 9:
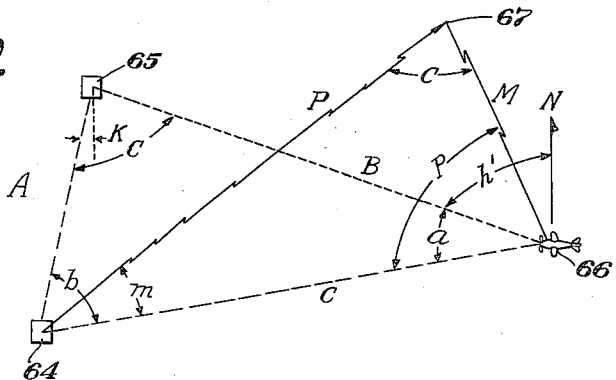
Fig. 9 is a diagrammatic plan layout of a modified form of beacon system in accordance with the principles of my invention.

In the foregoing figures, I have described an arrangement of the type wherein a rotatable directive transmitter is used at the radio lighthouse. With this type of system a single transmitter is provided on the ground but this transmitter should generally be quite sharply directive. In Fig. 9 is illustrated a double or twin lighthouse beacon arrangement which may be likewise used in accordance with the principles of my invention. In this arrangement, two fixed transmitters 64 and 65 are provided. These transmitters may operate on the same or on different frequencies but for simplicity of explanation a system in which they operate on different carrier frequencies will be described. According to this arrangement, both transmitters 64 and 65 may be omnidirectional and one of these transmitters, for example transmitter 64, may transmit a plurality of timed pulses to be used for distance determination. The receiver may be located on a movable craft as shown at 66. These three equipments 64, 65 and 66 can be shown then to define a basic triangle with sides A, B and C similar to the basic triangle illustrated in Fig. 1. By triangulation in the receiver 66 together with a reference direction indication such as may be produced by magnetic or other type compass, the location of the receiver 66 with respect to the transmitting beacons 64 and 65 may be readily calculated. Thus, the angles $h'$, $a$, $b$, $c$ may all be readily determined on the craft if $k$ is known. A reflecting or other reradiating object is shown at 67. This object is shown at the apex of a triangle whose base is the distance C. In order to obtain the location of reflecting point 67 it is necessary then to solve the triangle C, M, P. The angle $m$ opposite M together with the side C and the angle $p$ will furnish all of the necessary parameters for the calculation of the position of reradiating object 67. It will therefore be clear that this arrangement serves as a radio beacon in which the production of indications similar to those shown in previous Figs. 7 and 8 may be provided.

Figure 10:
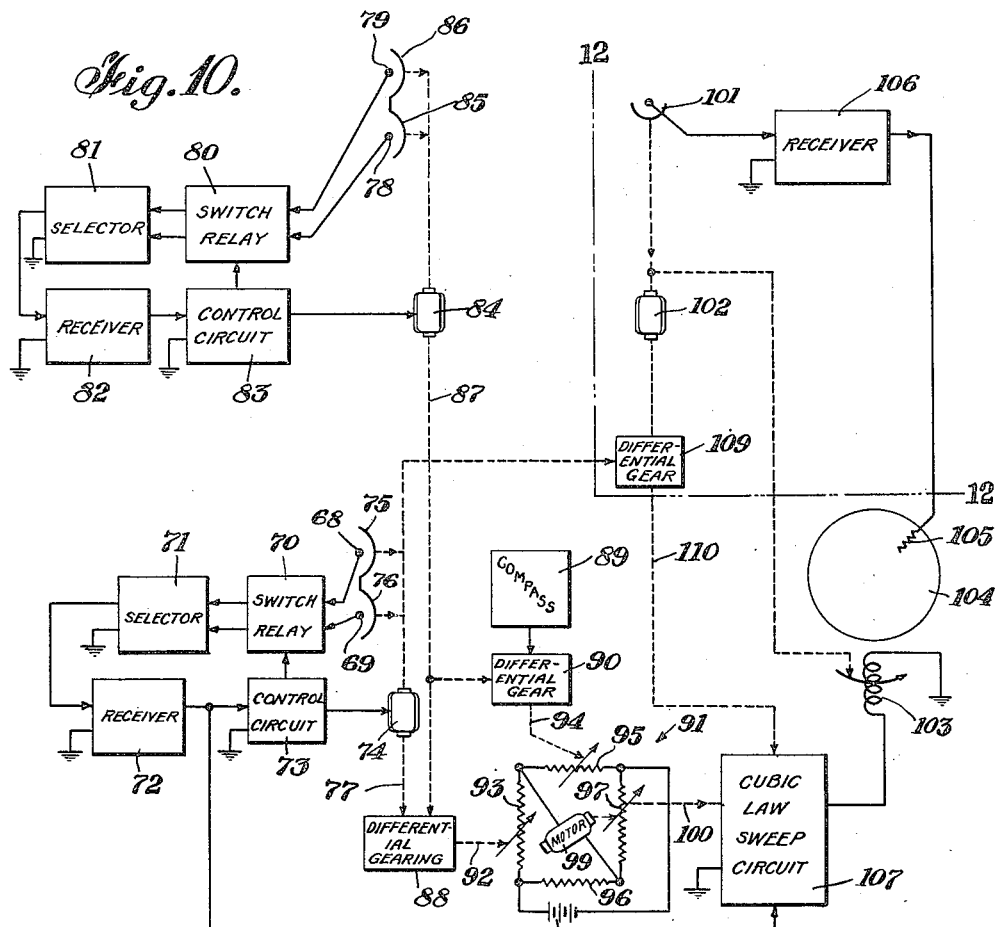
Fig. 10 is a schematic circuit and mechanical diagram illustrating a receiver for use with the system illustrated in Fig. 9.

In Fig. 10 an arrangement for calculating this triangle to produce the desired indications is shown. For simplification of explanation, separate antenna units are shown for reception of energy from transmitters 64 and 65 and a still further separate directive antenna for the purpose of receiving directive pulses such as transmitted from reradiating object 67. Since side A of the triangle of Fig. 9 is a known quantity, the triangle may be readily calculated simply by determining angle $a$ and angle $b$ which will give us the distance C. A first receiver arrangement for receiving energy from radiator 64 may consist of a directive antenna system including the two directive antennas 68 and 69 which are alternately connected through switching relay 70 to a selector 71 which serves to select the distinctive waves radiated from transmitter 64. These waves may be distinguished from those transmitted from transmitter 65 either in frequency or pulse width or some other desirable characteristic. The output from selector 71 is applied to a receiver 72 and from there to a control circuit 73 which serves through the medium of a motor 74 to control the positions of reflectors 75 and 76 associated with antennas 68 and 69 respectively, so that the antennas will be continuously aligned with the transmitter 64. A second receiver having antennas 78 and 79 is arranged in cooperation with switching relay 80, selector 81, receiver 82, control circuit 83 and a motor 84 continuously to maintain reflectors 85 and 86 of antennas 78 and 79 aligned with transmitter 65. The associated shaft 87 will therefore be continuously aligned in accordance with this direction. Angle $a$ of Fig. 9 will therefore be directly determined by means of the difference between shafts 77 and 87 as determined in differential gear mechanism 88.

Angle $c$ of Fig. 9 clearly is equal to angle $k+h$. By arranging radiators 64 and 65 in the direction of north N, angle $k$ reduces to zero so angle $c$ is then directly equal to angle $h$. This angle may be readily determined in the receiving equipment by obtaining the difference between a shaft positioned in accordance with a compass 89 and shaft 87, for example, by a differential gearing mechanism 90. The distance C may then be obtained from the expression $$A \frac{\sin c}{\sin a} = C$$

This solution may be obtained in a follow-up bridge circuit arrangement such as shown generally at 91. Output shaft 92 from differential gearing mechanism 88 varies the resistance 93 of the bridge network in accordance with sin $a$. Output shaft 94 from differential gearing 90 varies the resistance of 95 of the bridge network 91 in accordance with sin $c$. The bridge 91 comprises two further resistor elements 96 and 97 which must be properly adjusted to maintain the bridge in balance 96 having a value corresponding to known distance A. Across one diagonal of the bridge is arranged a voltage source 98 as indicated as a battery and across the other diagonal is provided a motor 99. Motor 99 is connected to variable resistor 97 of the bridge. Upon change of either resistors 93 or 95, the balance of the bridge is upset and motor 99 serves to adjust resistor 97 until balance is again reestablished. Thus, shaft 100 controlled by the movement of motor 99 serves continuously to provide a measurement of the distance C.

A sharply directive antenna 101 is continuously rotated at a relatively high speed by a motor 102. Motor 102 simultaneously serves to drive deflecting coil 103 about cathode ray oscillograph 104 synchronously with the rotation of antenna 101. Thus as antenna 101 rotates, the beam of the oscilloscope will be angularly positioned in accordance with the positioning of antenna 101. Normally the beam of the oscilloscope is blocked by grid 105 so that no tracings appear on the face of the screen. Whenever energy is received in antenna 100, however, the received energy is applied through receiver 106 to grid 105 to produce an indication located angularly with respect to the screen of the oscilloscope in accordance with the angular position of antenna 101 at that time. Thus on oscilloscope 104 will be indicated the direction of each reflecting object. However, and in order to show the true position of these reflecting objects, the radial deflection of the beam of the oscilloscope must be controlled so as to show the distance M or P properly on the screen depending upon whether the indication is to be provided to show a duplicate type of indication as shown in Fig. 7 or a phantom indication of the type shown in Fig. 8. In order to show this type of sweep, the radial deflection must be controlled not only in accordance with the timing of the pulse energy transmitted from transmitter 64 but also must take into account the distance C and the measurements of angles $m$ or $p$. As shown in Fig. 10, the sweep control circuit 107 is controlled by input energy from receiver 72 over line 108 as well as by shaft 100 which corresponds to the distance C and by a further control which combines the rotation of motor 102 with the rotary position of motor 74 in a differential gearing mechanism 109 so that its output shaft 110 will represent the angle $p$.

The deflection voltage produced by sweep circuit 107 may be defined by the following equation:

(1)
$$SM = [\tfrac{1}{2}Sv\Delta + SC \text{ hav } p] + [SC \cos p] - \left[\frac{S^2C^2 \sin^2 p}{4}\right]\left[\frac{1}{\tfrac{1}{2}Sv\Delta + SC \text{ hav } p}\right]$$

in which S equals the electrostatic deflection factor (in volts per mile represented); M is equal to the value shown in Fig. 9, $v$ equals the velocity of propagation (in miles per microsecond); $\Delta$ equals $P+M-C \div v$, equals pulse delay (in microseconds); hav $p$ is the standard mathematical notation for haversine $p$ which is $\tfrac{1}{2}(1-\cos p)$. Thus the sweep circuit 107 is designed to produce radial deflection on the screen of the cathode ray oscilloscope 104 properly correlated for the distance to be measured.

To perform the calculations the sweep circuit may be made in the form such as illustrated in Fig. 11. In this figure the output from receiver 72 is applied over line 108 to a sawtooth sweep circuit 111 producing a linear sweep giving rise to $\tfrac{1}{2}$ $Sv$ volts per microsecond. This corresponds substantially to the first term in the first bracket of the equation given above the increment $\Delta$. Shaft 100 is coupled to rotatable contact arms 112, 113 and 114 of resistance elements 115, 116 and 117 respectively, to control these resistance values in accordance with the positioning of shaft 100. Shaft 110 is coupled to control voltage source 118 and amplifier 119. To secure the addition of the linear sweep with the second term in the first bracket of the equation, the voltage from source 118 is applied across resistor 115, the resistor 115 being tapered to have the characteristic hav $p$ for the corresponding adjustments of shaft 100. Voltage source 118 is adjusted in value in accordance with the positioning of shaft 110 so that a constant voltage output will be maintained for each position of shaft 110, this voltage being proportional to SC. As a consequence, the output from movable arm 112 will be proportional to the second term of Equation I. This output voltage is added to the output voltage from sawtooth sweep circuit 11 in D. C. restorer 120. The sawtooth voltage being applied to 120 over a coupling condenser 121 so that the D. C. restoration is necessary. This voltage is then applied to the deflection plates 122 and cathode ray tube 123.

Cathode ray tube 123 may be of the type having an output target electrode 124 providing a fixed pattern which may be scanned to produce an output voltage following a given law. In the present system, electrode 124 is shaped to give an output voltage equal to 1 divided by the input voltage. The input voltage is equal to the complete first bracketed term of the Equation I. Tube 123 may be generally of the type known to the trade as a "Monoscope" such as is commonly used in inserting fixed advertising or trade mark matter. However, instead of inserting signals representing such advertising matter, target electrode 124 is arranged to provide the desired output conversion of the applied sweeping potential. It will be seen that the output directly from this electrode is equal to the last bracketed term of the equation as listed above. This voltage must also be multiplied by another factor corresponding to the next last bracketed term of the equation. This latter factor is determined by the amplification factor of stabilized amplifier 119 with its gain control rotated by control shaft 110 in accordance with distance C and tapered to give a gain corresponding to $\tfrac{1}{4} S^2C^2$ and provided with potentiometer 114 and 117 having its resistance tapered to provide a voltage division corresponding sin $^2 p$. Thus the output voltage in line 125 will be in correspondence with the resultant two last bracketed factors of the equation.

The sum of the first and second bracketed term of the equation SC cos $p$ is still to be derived. This voltage may be derived through the output of sawtooth sweep circuit 108 coupled through coupling condenser 126 to the input of a D. C. restorer circuit 127 to the output of which is added the voltage produced in the output of potentiometer 113, 116. The resistance value of 116 is tapered then to give an output equal to "hav $p$ + cos $p$." This value then is coupled over line 128 to add in combining circuit 129 with the output voltage from line 125 coupled to the combining circuit over coupling condenser 130 to provide a final output sweep voltage corresponding to SM as outlined above.

This output voltage is of proper value for application to electrostatic deflecting electrodes of an oscillograph. Since the circuit shown is provided with a deflection coil, the output sweep voltage is converted into a suitable deflection current by voltage converter 131. This current converter produces a higher power differentiated wave which will give the desired current through coil 103 in spite of the impedance offered by the coil itself to changes of current. With this circuit arrangement, therefore, I, have provided completely for the production on oscilloscope 104 for the indication of position of reflecting objects. The indications produced on oscilloscope 104 will be substantially similar to those shown in connection with Figs. 7 and 8.

In connection with Fig. 10, a receiver system has been shown wherein the directive action is produced directly on the craft itself. However, in some instances it may be desirable to provide for sharp directivity on the ground so that it will not be necessary to provide on the moving craft a highly directive antenna. This is particularly true since highly directive antennas are generally quite large in proportion to the wavelength used. Accordingly at the principal beacon station of Fig. 9, that is at 64, there may be provided a sharply directive pulse transmitter rotating at a fixed rate of speed as well as the omnidirectional transmitter previously described. If then in the circuit of Fig. 10 the arrangement shown in Fig. 12 is substituted, for parts 101, 102, 106, 109, 110, the desired indications may be produced on the craft without the use of the sharply directive antenna. In Fig. 12, an omnidirectional antenna 132 is provided to receive the highly directive pulse energy from transmitter 64. This pulse energy is applied to receiver 134 and hence to the indicator grid as shown in Fig. 10. Part of the output of 134 is branched to a control circuit 135 which may include a maximum finding circuit, a fixed speed motor and a start-stop clutch mechanism such as illustrated at 14, 15 and 16 of Fig. 3. Thus, the output shaft 136 will rotate substantially in synchronism with the sharply directive beacon at point 64 instead of in synchronism with a rotatable antenna as in the case of Fig. 10. This output shaft may then serve to control the cubic law sweep circuit such as 107 and the rotation of the deflection coil 103 of Fig. 10 in the same manner as the circuit of that system.

The indication produced on the scope with a receiver circuit such as shown by the combinations of Figs. 10 and 12 will be generally similar to those illustrated previously. However, in this arrangement the position of the craft carrying the receiver will always appear at a fixed point of the scope, for example at the upper edge, rather than being correlated with any specific compass direction. The relative location of the various elements with respect to one another will show up on the screen in the same manner as previously described with the center of the scope representing the transmitting station. It is clear that other types of systems utilizing omnidirectional reception may be provided in connection with the various beacon arrays contemplated within the scope of my invention. It must be borne in mind, however, that in accordance with the principles of my invention a directive action must be provided either on the ground station or on the craft or on both. The receiving scope must therefore be controlled in direction so that a directive line either from the transmitter or from the receiver is swept at a given rate and the angular sweep of the oscilloscope must be synchronized with the sweep of this directive line.

It should be further understood that in accordance with my system other distance determining means than those shown in the various forms so far outlined may be substituted for the specific types shown. In such a case, the receiving apparatus may be modified to produce other output controls which will give the desired distance indication C. Furthermore, the direction finding functions of the various antenna arrangement shown may be combined in a manner readily understood by those skilled in the art without departing from the spirit of my invention as outlined. Furthermore, different combinations of transmitters for providing the desired distance indicating arrangements for the receiver apparatus may be likewise supplied by those skilled in the art in place of those shown in the present application. Furthermore, many variations in the structures to obtain results in accordance with the principles of my invention will occur to those skilled in the art. Accordingly, the description of the specific systems set forth in this application is not to be considered as any limitation of my invention as set forth in the objects thereof and in the accompanying claims.

I claim:

1. The method of indicating at a receiving point spaced an unknown distance from a radiator point, the location of reradiating objects, comprising receiving energy radiated directly from said radiator point and energy radiated from said radiator point after reradiation from said objects, obtaining the direction lines from said receiving point to said objects and said radiator point in response to said received reradiated and radiated energy, respectively measuring the relative timing of said received reradiated energy and the energy from said radiator to determine the distance parameters of said reradiating object, and producing an indication showing the relative location of said objects in response to said determined parameters.

2. The method of indicating at a receiving point spaced a distance from a radiator point, the location of reradiating objects, comprising obtaining the position of said receiver with respect to said radiator, receiving energy radiated from said radiator point after reradiation from said objects, obtaining the direction lines from said receiving point to said objects in response to said received reradiated energy, measuring the relative timing of said received reradiated energy and the energy from said radiator to determine the distance parameters of said reradiating object, and combining all the determined parameters to produce a resultant indication of the relative location of said object with respect to said receiving and transmitting points.

3. The method of indicating the position with respect to a receiver of a reradiating object located in the field of a transmitter spaced from said receiver and transmitting energy toward said reradiating object, comprising obtaining the position of said receiver with respect to said transmitter, receiving energy radiated from said transmitter after reradiation from said object, obtaining the direction to said reradiating object in response to said received reradiated energy, obtaining distance parameters by comparison of the received reradiated energy timing with respect to the timing of the transmission of said energy from said transmitter, and combining the obtained parameters to provide an indication of the position of said reradiating objects.

4. A system for indicating at a receiver equipment spaced a predetermined distance from a radiator equipment, the location of reradiating objects, comprising means at said receiver for receiving energy radiated from said radiator equipment after reradiation from said objects, direction determining means at said receiver for determining the direction lines from one of said equipments to said objects in response to said reradiated energy, means for comparing the timing of said received reradiated energy with the timing of energy from said radiator to determine the distance parameters of said reradiating object, and means responsive to said determined parameters for producing an indication of the positions of said reradiating objects.

5. A receiver system for indicating the position with respect to said receiver of a reradiating object located in the field of a transmitter spaced from said receiver and transmitting energy toward said reradiating object, comprising means for determining the position of said receiver with respect to said transmitter, receiver means for receiving energy transmitted by said transmitter after reradiation by said object, means responsive to said received reradiated energy for determining the direction to said reradiating object in response to said received reradiated pulses, indicator means, means responsive to the determined position and direction parameters for operating said indicator visually to show the position of said reradiating object.

6. A radio position indicating system for providing indications of the location of a reradiating object with respect to a receiver, comprising a transmitting station for directively transmitting energy from a predetermined point in a predetermined directive pattern, means for sweeping the directive pattern over a given area including said reradiating object, means at said receiver for determining the position of said receiver with respect to said predetermined point, means for receiving the transmitted energy reradiated from said object, means for determining at said receiver the direction to said reradiating object, indicator means, means for controlling said indicator means in accordance with the determined position and direction parameters, and means for applying received reradiated energy to said indicator to produce a position indication of said reradiating object.

7. A system for indicating at a single receiver point the position of reflecting objects in the field of a transmitting system including a pair of spaced transmitters, comprising means at said point for receiving energy from said transmitters, means for determining the location of said transmitters relative to said point in response to said received energy, means for receiving energy transmitted from said transmitters after reradiation from said objects at said points, means for determining the directions of said objects in response to the received reradiated energy, indicator means, means for controlling said indicator means in accordance with the determined parameters, and means for applying received reradiated energy to said indicator to produce a position indication of said reradiating object.

8. A system according to claim 7, wherein one of said transmitters is a directive transmitter, and said means for receiving energy is directional.

9. A system according to claim 7, wherein said transmitters operate at different carrier frequencies, at least one of said transmitters transmitting energy in the form of spaced pulses.

10. A system according to claim 7, wherein one of said transmitters is a repeater station, said receiver further comprising a rotatable directive receiving antenna system.

11. A system according to claim 7, wherein said transmitters are omnidirectional and operate at different carrier frequencies, at least one of said transmitters transmitting energy in the form of spaced pulses, said receiver further comprises a sharply directive receiver antenna.

12. A position indicating system for indicating the position of a rotating directive pulse transmitter and a reradiating object from a given receiving location comprising means at said location for directively receiving pulse energy transmitted directly from said transmitter and energy transmitted from said transmitter for reradiation from said reradiating object, means for determining the directions of said transmitter and said reradiating object at said location in response to said received pulse energy, means for determining the rotary angular position of said transmitter when aligned with said reradiating object, and indicator means for controlling said indicator in response to the determined direction and position parameters, and means for applying said received pulse energy to said indicator whereby their position relative to said location may be indicated.

13. A system for indicating at a receiver point the relative position of a reradiating object located in the radiation field of a radiant energy transmitter spaced from said receiver point a distance and spaced from said object comprising means for receiving said radiant energy from variably selective directions, means for determining the variably selective directive characteristics of said receiver, an oscilloscope indicator having a beam scannable in distance indicating coordinates and in angular indicating coordinates, means dependent upon said distance and responsive to said variably selective directional characteristics for controlling said distance indicating coordinate scanning, means responsive to said variably selective directional characteristics for controlling said angular indicating coordinate scanning, and means for applying received signals to said indicator to vary a characteristic of the scanned beam of said indicator to indicate the location of the source of said received signals.

14. A system for indicating at a receiver point the relative position of a reradiating object located in the radiation field of a radiant energy transmitter spaced from said receiver point and spaced from said object, comprising means for receiving said radiant energy from variably selective directions, means responsive to the received energy for determining the distance and direction of said receiver with respect to said transmitter, means for determining the variably selective directive characteristics of said receiver, an oscilloscope indicator having a beam scannable in distance indicating coordinates and in angular indicating coordinates, means responsive to determination of said distance and direction, and said variably selective directional characteristics for controlling said distance indicating coordinate scanning, means responsive to said variably selective directional characteristics for controlling said angular indicating coordinate scanning, and means for applying received signals to said indicator to vary a characteristic of the scanned beam of said indicator to indicate the location of the source of said received signals.

15. A system for indicating at a receiver point the relative position of a reradiating object located in the radiation field of a radiant energy transmitter spaced from said receiver point a predetermined distance and spaced from said object, comprising means for receiving said radiant energy, means for cyclically varying a selective directive characteristic of said receiver, an oscilloscope indicator having a beam scannable in distance indicating coordinates and in angular indicating coordinates, means dependent upon said predetermined distance and responsive to said cyclic variation for controlling said distance indicating coordinate scanning, means responsive to said variably selective directional characteristics for controlling said angular indicating coordinate scanning, and means for applying received signals to said indicator to vary a characteristic of the scanned beam of said indicator to indicate the location of the source of said received signals.

16. A system for indicating at a receiver point the relative position of a reradiating object located in the radiation field of a radiant energy transmitter spaced from said receiver point and spaced from said object, comprising means for receiving said radiant energy from variably selective directions, means responsive to the received energy for determining the distance and direction of said receiver with respect to said transmitter, means for cyclically varying a selective directive characteristic of said receiver, an oscilloscope indicator having a beam scannable in distance indicating coordinates and in angular indicating coordinates, means responsive to determination of said distance and direction and said cyclic variation for controlling said distance indicating coordinate scanning, means responsive to said variably selective directional characteristics for controlling said angular indicating coordinate scanning, means for applying received signals to said indicator to vary a characteristic of the scanned beam of said indicator to indicate the location of the source of said received signals.

17. A position indicating system comprising, a transmitter means for transmitting radiant energy over a given area, a receiver means for receiving said energy directly transmitted from said transmitter, means for receiving energy reradiated from reradiating objects in the field of said transmitter means, means at said receiver for determining the distance and direction of said transmitter means relative to said receiver, means for determining the direction toward said reradiating objects in response to energy reradiated therefrom, means for determining the relative direct distance of said transmitting means and the distances by way of said reradiating objects, an oscilloscope indicator, means for sweeping the beam of said oscilloscope indicator over distance indicating coordinates in response to the above determined distance and direction parameters, means for sweeping the beam of said oscilloscope indicator over azimuth indicating coordinates in synchronism with direction determining means, and means for applying said received energy to said oscilloscope radiator to control the brightness of said beam to produce object indications of the relative location of said transmitting means and said reradiating objects.

18. In a receiver wherein the directive reception characteristics of the receiver are continuously varied and the distance to a transmitter and the relative timing of energy directly received from said transmitter and from a reradiating object in the field of said transmitter is continuously determined, an indicator system for providing a visual indication of the relative location of reradiating objects in the field of said transmitter in response to received reradiated energy comprising, an oscilloscope indicator means for deriving a radial sweep for the beam of said oscilloscope corresponding to a combination of said continuously determined values of distance and relative timing and said continuously varied values of direction, means for deriving an angular sweep for said beam synchronized with the variation of the directive reception characteristics of said receiver, and means for controlling the brilliance of said beam in response to said received reradiated energy.

19. A radio position indicating system comprising a radio beacon for transmitting a directive radiation sweeping over an area including reradiating objects, a receiver spaced from said transmitter for receiving energy from said transmitter and from said objects, a directive receiving means at said receiver rotating at a predetermined speed, means for continuously determining the distance and direction of said receiver from said transmitter in response to received energy, means for continuously determining the difference in time of reception of energy directly from said transmitter and from said reradiating objects, an oscilloscope indicator, means for producing a sweep for the beam of said oscilloscope proportional to distance under control of the continuously determined distance, direction and time difference factors, means for producing a direction indicating sweep for said oscilloscope synchronized with said predetermined speed, and means for applying said received energy to said indicator to alter a characteristic of said beam to produce indications corresponding in distance and direction to the distance and direction of objects from which energy is received.

20. A system according to claim 19 wherein said means for continuously determining the direction of said transmitter comprising a directive antenna and means for maintaining said antenna aligned with said transmitter.

21. A position indicating system comprising two spaced omnidirectional radio transmitters, one of said transmitters transmitting pulses at a predetermined spacing over an area including reradiating objects, a receiver spaced from said transmitters, means at said receiver for calculating the distance from said transmitters by triangulation, a continuously rotatable directive antenna, means for receiving on said antenna energy from said one transmitter and from said reradiating objects, means for producing a sweep voltage timed with the directly received pulses from said one transmitter and variable with said calculated distance and said rotatable antenna to represent distance, an oscilloscope indicator, means for applying said produced sweep voltage to said indicator to control radial deflection of the beam of said oscilloscope, means for controlling the angular sweep of said beam in synchronism with the rotation of said antenna, and means for applying said received pulse signals to said oscilloscope to produce position indicating characteristics in said beam.

22. A position indicating system comprising two spaced radio transmitters, one of said transmitters transmitting pulses from a first point at a predetermined spacing over an area including reradiating objects, a receiver at a second point spaced from said transmitters, means at said receiver for calculating the distance from said one transmitter by triangulation, means for rendering the radiant action at one of said points directive, means for rotating the directive pattern at a predetermined speed, means for receiving energy from said one transmitter and from said reradiating objects, means for producing a sweep voltage timed with the directly received pulses from said one transmitter and variable with said calculated distance and the rotary position of said directive pattern to represent distance, an oscilloscope indicator, means for applying said produced sweep voltage to said indicator to control radial deflection of the beam of said oscilloscope, means for controlling the angular sweep of said beam in synchronism with the rotation of said directive pattern, and means for supplying said received pulse signals to said oscilloscope to produce position indicating characteristics in said beam.

23. A position indicating system comprising two spaced omnidirectional radio transmitters, one of said transmitters transmitting pulses at a predetermined spacing over an area including reradiating objects, a receiver spaced from said transmitters, means at said receiver for calculating the distance from said transmitters by triangulation, a continuously rotatable directive antenna, means for receiving on said antenna energy from said one transmitter and from said reradiating objects, means for producing a sweep voltage timed with the directly received pulses from said one transmitter and variable with said calculated distance and said rotatable antenna to represent distance, cathode ray oscilloscope indicator having an electron beam, a deflection control means and a control grid, means for applying said produced sweep voltage to said deflection control means to control radial deflection of the beam of said oscilloscope, means for rotating said deflection control means to control the angular sweep of said beam in synchronism with the rotation of said antenna, and means for applying said received pulse signals to said control grid to control the brilliance of said beam.

24. A position indicating system comprising two spaced omnidirectional radio transmitters, one of said transmitters transmitting pulses from a first point at a predetermined spacing over an area including reradiating objects, a receiver at a second point spaced from said transmitters, the radiant action at one of said points being directive, means at said receiver for calculating the distance from said one transmitter by triangulation, means for rotating the directive radiant acting pattern at a predetermined speed, means for receiving on said antenna energy from said one transmitter and from said reradiating objects, means for producing a sweep voltage timed with the directly received pulses from said one transmitter and variable with said calculated distance and the rotary position of said directive pattern to represent distance, a cathode ray oscilloscope indicator having an electron beam, a deflection control means, and a control grid, means for applying said produced sweep voltage to said deflection control means indicator to control radial deflection of the beam of said oscilloscope, means for rotating said deflection control means to control the angular sweep of said beam in synchronism with the rotation of said antenna, and means for applying said received pulse signals to said control grid, to control the brilliance of said beam.

25. A position indicating system comprising two spaced omnidirectional radio transmitters, one of said transmitters transmitting pulses at a predetermined spacing dependent upon the distances to be covered over an area including reradiating objects, a receiver spaced from said transmitters, means at said receiver for measuring the angles to said transmitters, a means for calculating the distance from said transmitters from said measured angles and the spacing of said beacons, a continuously rotatable directive antenna, means for receiving on said antenna energy from said one transmitter and from said reradiating objects, means for producing a sweep voltage timed with the directly received pulses from said one transmitter and variable with said calculated distance the rotary position of said antenna to represent distance, an oscilloscope indicator, means for applying said produced sweep voltage to said indicator to control radial deflection of the beam of said oscilloscope, means for controlling the angular sweep of said beam in synchronism with the rotation of said antenna, and means for applying said received pulse signals to said oscilloscope to produce position indicating characteristics in said beam.

26. In a receiver, cooperating with a remote transmitter wherein the directive reception pattern of said receiver is continuously varied, and the distance to said transmitter and the relative timing of energy directly received from said transmitter and from a reradiating object in the field of said transmitter is continuously determined, an indicator system for providing a visual indication of the relative location of reradiating objects in the field of said transmitter in response to received reradiated energy comprising an oscilloscope indicator, means for deriving a radial sweep for the beam of said oscilloscope in response to said continuously determined values of distance and relative timing means for providing an angular sweep for said beam synchronized with the directivity variations of said reception pattern, and means for controlling the brilliance of said beam in response to said received reradiated energy.

27. A radio position indicating system comprising a radio beacon for transmitting a directive radiation sweeping over an area including reradiating objects, a receiver spaced from said transmitter for receiving energy from said transmitter and from said objects, a directive receiving means at said receiver rotating at a predetermined speed, means for continuously determining the distance and direction of said receiver from said transmitter in response to received energy, means for continuously determining the difference in time of reception of energy directly from said transmitter and from said reradiating objects, an oscilloscope indicator, means for producing a sweep for the beam of said oscilloscope proportional to distance under control of the continuously determined distance, direction and time difference factors, means for producing a direction indicating sweep for said oscilloscope synchronized with the sweep of the beam at said transmitter, and means for applying said received energy to said indicator to produce indications corresponding in distance and direction to the distance and direction of objects from which energy is received.

28. A radio position indicating system comprising a radio beacon for transmitting, a radiation pattern over an area including reradiating objects, a receiver spaced from said transmitter for receiving energy from said transmitter and from said objects, a directive receiving means at said receiver rotating at a predetermined speed, means for continuously determining the distance and direction of said receiver from said transmitter in response to received energy, means for continuously determining the difference in time of reception of energy directly from said transmitter and from said reradiating objects, an oscilloscope indicator, means for producing a sweep for the beam of said oscilloscope proportional to distance under control of the continuously determined distance, direction and time difference factors, means for producing a direction indicating sweep for said oscilloscope synchronized with said predetermined speed, and means for applying said received energy to said indicator to produce indications corresponding in distance and direction to the distance and direction of objects from which energy is received.

29. A radio position indicating system comprising a radio beacon for transmitting a directive radiation pattern rotatably to cover an area including reradiating objects, a receiver spaced from said transmitter for receiving energy from said transmitter and from said objects, a directive receiving means at said receiver rotating at a predetermined speed higher than that of said beacon, means for continuously determining the distance and direction of said receiver from said transmitter in response to received energy, means for continuously determining the difference in time of reception of energy directly from said transmitter and from said reradiating objects, an oscilloscope indicator, means for producing a sweep for the beam of said oscilloscope proportional to distance under control of the continuously determined distance, direction and time difference factors, means for producing a direction indicating sweep for said oscilloscope synchronized with said predetermined speed, and means for applying said received energy to said indicator to produce indications corresponding in distance and direction to the distance and direction of objects from which energy is received.

30. A radio position indicating system for aircraft for use with a beacon at a relatively fixed location for transmitting signals rotatably about said beacon, and signals having a predetermined different signal characteristic for each azimuthal direction, comprising a plurality of means on each of a plurality of aircraft for receiving and responding to signals from said beacon for the predetermined azimuthal position of said craft, a transmitter on each craft for transmitting signals in response to the receiver response, timed with the responding of said receiver, direction indication apparatus on at least one of said craft, said indicator having a variable sweep indicator, means for synchronizing the sweep of said indicator with the rotation of said beacon, means for receiving the signals transmitted from the other craft, and means for applying said signals to said indicator whereby a directional display of the azimuthal position of said other craft will be made thereon.

HENRI G. BUSIGNIES.

REFERENCES CITED

The following references are of record in the file of this patent:

UNITED STATES PATENTS

| Number | Name | Date |
| --- | --- | --- |
| 1,981,884 | Taylor et al. | Nov. 27, 1934 |
| 2,086,742 | Scharlau | July 13, 1937 |
| 2,408,048 | Deloraine et al. | Sept. 24, 1946 |
| 2,413,620 | Guanella | Dec. 31, 1946 |
| 2,420,408 | Behn | May 13, 1947 |
| 2,425,008 | Royden | Aug. 5, 1947 |
| 2,427,219 | Luck | Sept. 9, 1947 |
| 2,427,220 | Luck | Sept. 9, 1947 |

FOREIGN PATENTS

| Number | Country | Date |
| --- | --- | --- |
| 520,778 | Great Britain | May 3, 1940 |
| 542,634 | Great Britain | Jan. 21, 1942 |
| 116,666 | Australia | Oct. 10, 1941 |